United States Patent [19]

Onizuka et al.

[11] Patent Number: 5,209,905
[45] Date of Patent: May 11, 1993

[54] WET-TYPE EXHAUST GAS DESULFURIZATION SYSTEM HAVING A MEANS FOR SUPPLYING AIR

[75] Inventors: Masakazu Onizuka; Kenji Inoue; Naohiko Ukawa; Susumu Okino; Toru Takashina, all of Hiroshima, Japan

[73] Assignee: Mitsubishi Jukogyo Kabushiki Kaisha, Tokyo, Japan

[21] Appl. No.: 803,172

[22] Filed: Dec. 5, 1991

[51] Int. Cl.$^5$ .................. B01D 50/00; C10B 17/00
[52] U.S. Cl. .................. 422/168; 422/169; 422/172; 422/257; 422/281; 423/243.03; 261/DIG. 75
[58] Field of Search ............... 422/168, 169, 172, 255, 422/256, 257, 261, 262, 281, 283; 261/76, 94, DIG. 75; 55/223, 233; 239/431, 434; 423/242 R, 243

[56] References Cited

U.S. PATENT DOCUMENTS

| | | | |
|---|---|---|---|
| 3,960,175 | 6/1976 | Liepe et al. | 137/604 |
| 4,114,195 | 9/1978 | Dirksing et al. | 366/167 |
| 4,723,968 | 2/1988 | Schippert et al. | 55/80 |

FOREIGN PATENT DOCUMENTS

| | | |
|---|---|---|
| 0162536 | 11/1985 | European Pat. Off. . |
| 0224627 | 6/1987 | European Pat. Off. . |
| 0363009 | 4/1990 | European Pat. Off. . |
| 0033021 | 4/1981 | Japan ............ 55/223 |

*Primary Examiner*—Robert J. Warden
*Assistant Examiner*—Christopher Y. Kim
*Attorney, Agent, or Firm*—McAulay Fisher Nissen Goldberg & Kiel

[57] ABSTRACT

A wet-type exhaust gas desulfurization system comprises a reservoir for trapping an absorbing solution which has absorbed $SO_2$ from exhaust gas; an absorbing solution circulating tank disposed directly under the reservoir; a plurality of bottom pipes which are installed at the bottom of reservoir and extend downward into the absorbing solution in the circulating tank and whose lower end is open, or drop pipes which depend into the absorbing solution and whose lower ends are open; and air supply pipe at least one end of which is open to the atmosphere; a pipe for discharging the air above the surface of absorbing solution onto the surface of solution in the reservoir; and a pipe for supplying the absorbing solution in the circulating tank to a spray nozzle at the upper part of the absorbing tower.

7 Claims, 9 Drawing Sheets

WET-TYPE EXHAUST GAS DESULFURIZATION SYSTEM HAVING A MEANS FOR SUPPLYING AIR

FIELD OF THE INVENTION AND RELATED ART STATEMENT

This invention relates to a wet-type exhaust gas desulfurization system and, more particularly, to a wet-type exhaust gas desulfurization system which can recover gypsum by oxidizing sulfite produced in the absorbing solution by sulfur oxides (hereinafter abbreviated as $SO_2$) absorbed from exhaust gas.

In the conventional wet-type exhaust gas desulfurization system in which exhaust gas desulfurization is performed with calcium compound being used as an absorbent to recover gypsum, a conventional method for producing gypsum from calcium sulfite formed by a reaction between calcium compound and $SO_2$ is to extract slurry containing gypsum or calcium sulfite of stoichiometric quantity corresponding to the quantity of absorbed $SO_2$ from a circulating tank, and to oxidize the slurry in a separate oxidizing tower to produce gypsum from calcium sulfite. A system in which, the separate oxidizing tower being omitted, air or $O_2$-containing gas is blown directly into a circulating tank to produce gypsum by oxidizing calcium sulfite in the circulating tank has been disclosed in the Japanese Patent Publication No. 17318/1975 and the Japanese Patent Application No. 18269/1976. Further, a system in which an absorbing solution received by an absorbing solution receiving tank is re-sprayed into a circulating tank while air is supplied onto the surface of solution in the circulating tank has been disclosed in the Japanese Patent Publication No. 37252/1983. Still further, a system in which air is blown onto the surface of solution flowing down in an absorbing tower to accelerate oxidation has been disclosed in the Japanese Patent Application No. 178326/1983 and the Japanese Patent Application No. 167432/1986.

These conventional systems, which produce gypsum by blowing air for the oxidation of calcium sulfite, need to supply air by means of a blower or the like. Therefore, they have a disadvantage of requiring the power for supplying air.

OBJECT AND SUMMARY OF THE INVENTION

As described above, the conventional systems, in which air is used to oxidize sulfite produced by the absorption of $SO_2$ in the absorbing tower, have a problem of requiring much power to supply air.

In view of the foregoing, it is an object of this invention to provide a system which supplies air for oxidation to a wet-type exhaust gas desulfurization system without using power.

According to this invention (the first invention), (1) In a wet-type exhaust gas desulfurization system in which exhaust gas desulfurization is performed by gas-liquid contact between the exhaust gas containing sulfur oxides and an absorbing solution containing calcium compound in an absorbing tower, the wet-type exhaust gas desulfurization system having a means for supplying air comprises, (a) a reservoir for trapping the absorbing solution, which has absorbed sulfur oxides from the exhaust gas, at the bottom of the absorbing tower, (b) an absorbing solution circulating tank disposed directly under the reservoir, (c) a plurality of bottom pipes which are installed at the bottom of the reservoir and extend into the absorbing solution in the circulating tank and whose lower ends are open, (d) an air supply pipe which is disposed so as to cross through the bottom pipe and has openings at the through portion inside the bottom pipe and at least one end of which opens to the atmosphere, (e) a pipe through which the air above the surface of absorbing solution in the circulating tank is discharged onto the surface of the solution stored in the reservoir, and (f) a pipe for supplying the absorbing solution in the circulating tank to a spray nozzle disposed at the upper part of the absorbing tower via a pump.

(2) The wet-type exhaust gas desulfurization system having a means for supplying air described in (1) has a means for supplying water intermittently to the openings of the air supply pipe.

The above configuration of this first invention has the following effects:

When the absorbing solution which is stored in the reservoir and flows into the circulation tank through the bottom pipe passing through the side of the air supply pipe disposed through the bottom pipe, a negative pressure is produced on the lower surface of the air supply pipe by the separation of flow. This negative pressure acts on the openings which are positioned on the lower surface of air supply pipe in the bottom pipe; as a result, air is sucked from the one or both ends of air supply pipe which communicates with the atmosphere. The air is sucked by the absorbing solution in the bottom pipe through the openings of the air supply pipe. The air drops together with the absorbing solution into the circulating tank, where the oxygen in the air reacts with the sulfite produced by the absorption of $SO_2$ contained in the absorbing solution to form gypsum. In this invention, air is automatically sucked by using a negative pressure produced by the separation of flow occurring around an object at the downstream side of an object placed in the field of flow.

Cleaning water is intermittently sprayed to prevent the clogging of openings of air supply pipe which is caused by the deposit of salts at the wet boundary produced by the back flow due to the surface tension of absorbing solution.

According to this invention (the second invention), (1) In a wet-type exhaust gas desulfurization system in which exhaust gas desulfurization is performed by gas-liquid contact between the exhaust gas containing sulfur oxides and an absorbing solution containing calcium compound in an absorbing tower, the wet-type exhaust gas desulfurization system having a means for supplying air comprises, (a) a reservoir for trapping the absorbing solution, which has absorbed sulfur oxides from the exhaust gas, at the bottom of the absorbing tower, (b) an absorbing solution circulating tank disposed directly under the reservoir, (c) a plurality of bottom pipes which are installed at the bottom of the reservoir and extend into the absorbing solution in the circulating tank and whose lower ends are open, (d) an air supply pipe which is disposed opposite to the bottom pipe or inserted in the bottom pipe so as to be close to the upper end of bottom pipe and has an appropriate gap and the other end of which communicates with the atmosphere, (e) a pipe through which the air above the surface of absorbing solution in the circulating tank is discharged onto the surface of the solution stored in the reservoir, and (f) a pipe for supplying the absorbing solution in the circulating tank to a spray nozzle disposed at the upper part of the absorbing tower via a pump.

(2) The wet-type exhaust gas desulfurization system having a means for supplying air described in (1) has a means for supplying water intermittently to the air supply pipe.

(3) The wet-type exhaust gas desulfurization system having a means for supplying air described in (1) or (2) has a means for adjusting the positional relationship between the upper end of bottom pipe and the lower end of air supply pipe.

(4) The wet-type exhaust gas desulfurization system having a means for supplying air described in (1), (2) or (3) has a means for spraying a pumped solution downward into the bottom pipe or the air supply pipe.

The above configuration of this second invention has the following effects:

The absorbing solution is allowed to flow through the gap between the bottom pipe and the air supply pipe by using the potential energy of absorbing solution stored in the reservoir. Because the cross section of solution passage expands suddenly at the lower end of the air supply pipe, the flow of solution flowing down in the bottom pipe is separated at the periphery of the air supply pipe, so that a negative pressure depending on the flow speed of the solution is produced. By the negative pressure, air is sucked via the air supply pipe and directed to the circulating tank together with the solution flowing down in the bottom pipe for the oxidation in the circulating tank. The air accumulating above the surface of absorbing solution in the circulating tank is discharged onto the surface of absorbing solution stored in the reservoir so that the air is absorbed by the absorbing solution which drops from the absorbing tower to the reservoir. This uses the oxygen in the air more efficiently.

Cleaning is performed intermittently by supplying water via the air feeding pipe to prevent the clogging of air supply pipe due to the deposit of gypsum because gypsum is deposited at the wet boundary inside the air supply pipe due to the back flow of absorbing solution produced in the end of air supply pipe by the surface tension at the periphery of the air supply pipe.

The gap between the bottom pipe and the air supply pipe is varied by providing a means for adjusting the positional relationship between the upper end of bottom pipe and the lower end of air supply pipe, so that the amount of absorbing solution stored in the reservoir can be controlled.

The amount of sucked air can be controlled by spraying the pumped solution downward into the bottom pipe.

According to this invention (the third invention), (1) In a wet-type exhaust gas desulfurization system in which exhaust gas desulfurization is performed by gas-liquid contact between the exhaust gas containing sulfur oxides and an absorbing solution containing calcium compound in an absorbing tower, the wet-type exhaust gas desulfurization system having a means for supplying air comprises, (a) a reservoir which traps the absorbing solution, which has absorbed sulfur oxides from the exhaust gas, at the bottom of the absorbing tower, and has bottom pipes at its bottom, (b) an absorbing solution circulating tank disposed directly under the reservoir, (c) a drop pipe which is installed downwardly through the ceiling of circulating tank and extends into the absorbing solution in the circulating tank, and into which the bottom pipe is inserted close to the increased-diameter portion at the upper side of a restriction means, (d) a pipe through which the air above the surface of absorbing solution in the circulating tank is discharged onto the surface of the solution stored in the reservoir, and (e) a pipe for supplying the absorbing solution in the circulating tank to a spray nozzle disposed at the upper part of the absorbing tower via a pump.

(2) The wet-type exhaust gas desulfurization system having a means for supplying air described in (1) has a means for controlling the discharge amount of absorbing solution in the bottom pipe.

(3) The wet-type exhaust gas desulfurization system having a means for supplying air described in (1) or (2) has a bottom pipe whose inside diameter is decreased gradually toward the lower end.

The above configuration of this third invention has the following effects:

When the absorbing solution stored in the reservoir flows down in the bottom pipe and is injected toward the drop pipe, a negative pressure is produced by an aspirator (water jet pump) action at the gap between the lower end of bottom pipe and the drop pipe. By the produced negative pressure, air is sucked from the clearance between the upper opening of drop pipe and the bottom pipe. Furthermore, the air accumulating above the surface of absorbing solution in the circulating tank is discharged onto the surface of absorbing solution stored in the reservoir so that the air is absorbed by the absorbing solution which drops from the absorbing tower to the reservoir. This uses the oxygen in the air more efficiently.

The amount of absorbing solution flowing down in the bottom pipe can be controlled and the intermittent flow of absorbing solution in the bottom pipe can be performed in response to the variation in the amount of solution circulating in the absorbing tower by installing a control means such as a valve in the bottom pipe. Also, the absorbing solution can be injected as a jet flow from the bottom pipe into the drop pipe by downwardly decreasing the inside diameter of the bottom pipe.

DETAILED DESCRIPTION OF PREFERRED EMBODIMENTS

This invention will be described in detail on the basis of respective embodiments.

An embodiment of the first invention will be described with reference to FIG. 1.

Figure 1:
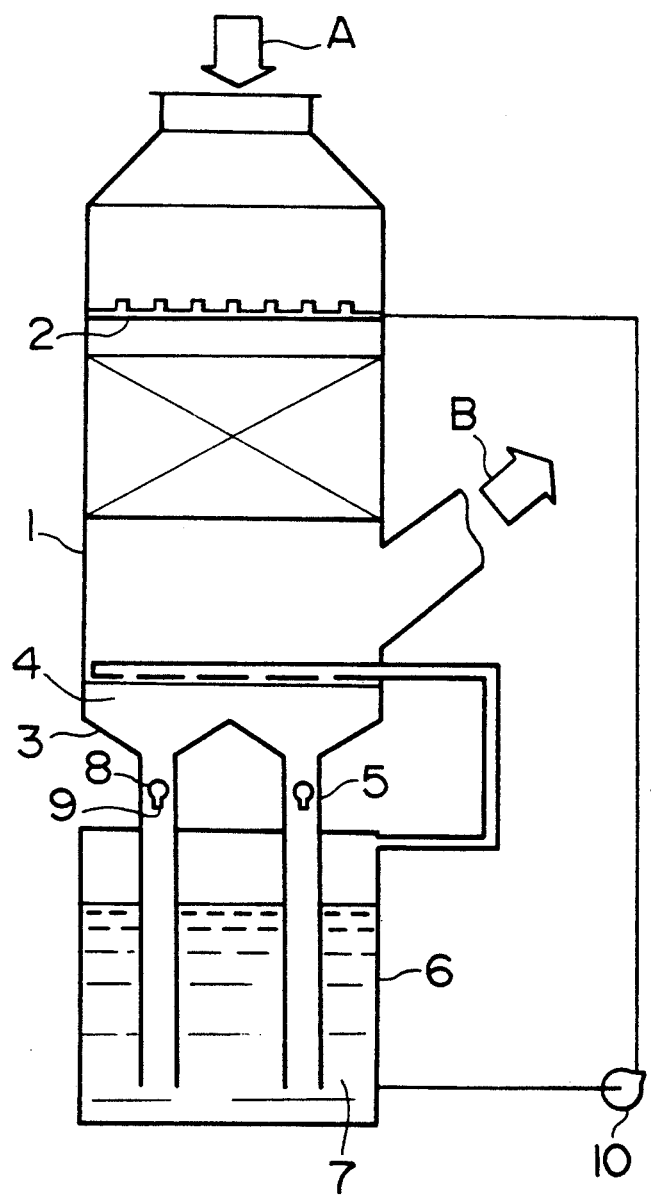
FIG. 1 is a schematic view of an embodiment of the first invention of this invention.

Referring to FIG. 1, exhaust gas A containing $SO_2$ is directed to an absorbing tower 1. Absorbing solution 7 stored in a circulating tank 6 of the absorbing tower 1 is supplied to a spray nozzle 2 by means of a circulating pump 10. The exhaust gas A is treated by gas-liquid contact with the absorbing solution containing calcium compound which is sprayed from the spray nozzle 2, and discharged as a treated exhaust gas B from the absorbing tower 1 after desulfurization.

The absorbing solution which has absorbed $SO_2$ in the absorbing tower 1 drops into a reservoir 3 at the bottom of the absorbing tower 1 and stored therein. The stored solution 4 is directed to the circulating tank 6 through a bottom pipes 5 which are connected to the bottom of the reservoir 3 and pass through the ceiling of the circulating tank 6 directly under the reservoir 3. The lower ends of the bottom pipes 5 are submerged in the solution 7 stored in the circulating tank 6. At the intermediate part between the bottom of reservoir 3 and the ceiling of the circulating tank 6, an air supply pipe 8 is installed which crosses through the bottom pipe. At least one end of the air supply pipe communicates with the atmosphere, and the through portion of the bottom pipe 5 has at least one air supply port 9 at its bottom.

Figure 2:
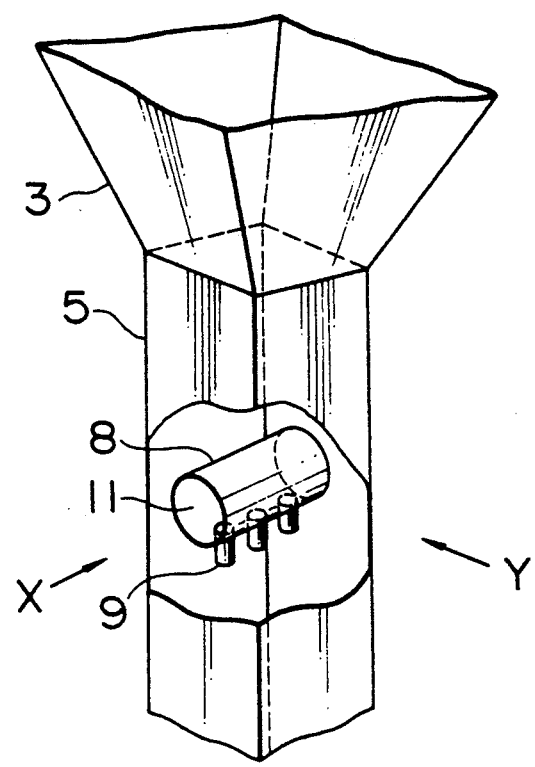
FIG. 2 is a partially enlarged perspective view of an embodiment of the first invention.
Figure 3:
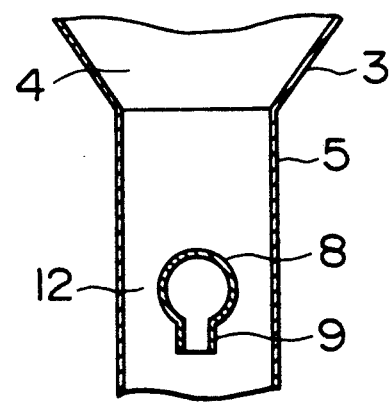
FIG. 3 is a sectional view taken in the direction of arrow X of FIG. 2.
Figure 4:
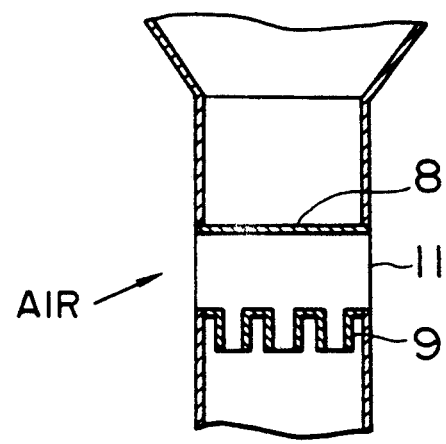
FIG. 4 is a sectional view taken in the direction of arrow Y of FIG. 2.

To explain the details of the air supply pipe portion, the partially enlarged views are shown in FIGS. 2 through 4. In FIG. 2, the air supply pipe 8 installed through the bottom pipe 5 depending from the bottom of the reservoir 3 has the air supply ports 9 at the bottom of its through portion. Also, the end of the air supply pipe 8 communicates with the atmosphere as an air suction port 11.

FIGS. 3 and 4 are sectional views taken in the direction of arrow X and Y, respectively, of FIG. 2. In FIG. 3, when the stored solution 4 in the reservoir 3 flows down through the bottom pipe 5, it passes through a clearance passage 12 between the air supply pipe 8 and the bottom pipe 5, which produces the separation of flow on the outside diameter surface of air supply pipe 8. The separation of flow creates a negative pressure on the external lower surface of the air supply pipe 8. The negative pressure allows air to be sucked through the air suction port 11 of the air supply pipe 8, and the sucked air is supplied from the air supply ports 9 to the absorbing solution flowing down in the bottom pipe. The supplied air flows down together with the solution flowing down in the bottom pipe 5 into the stored solution 7 in the circulating tank 6, where the oxygen which is a component of the supplied air reacts with the sulfite contained in the solution flowing down in the bottom pipe 5 to form gypsum.

Figure 5:
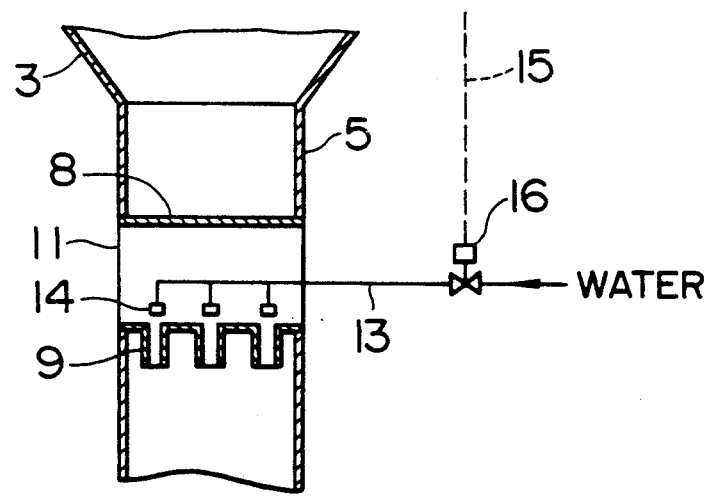
FIG. 5 is a sectional enlarged view of another embodiment of the first invention.

FIG. 5 is a typical view showing the cleaning system of air supply ports 9. The system has spray nozzles over the entrances of the air supply ports in the air supply pipe 8. The cleaning is performed intermittently with water fed through a water feeding pipe 13 having a control valve 16 halfway by operating the valve 16 in accordance with a control signal 15.

In the embodiment of this invention, the air supply pipe 8 has a circular cross section, but it may be differently shaped so that negative pressure is produced by the separation of flow; for example, it may have triangular or rectangular cross section or may be of cross arrangement or of multi-pipe system.

Next, an embodiment of the second invention will be described with reference to FIG. 6.

Figure 6:
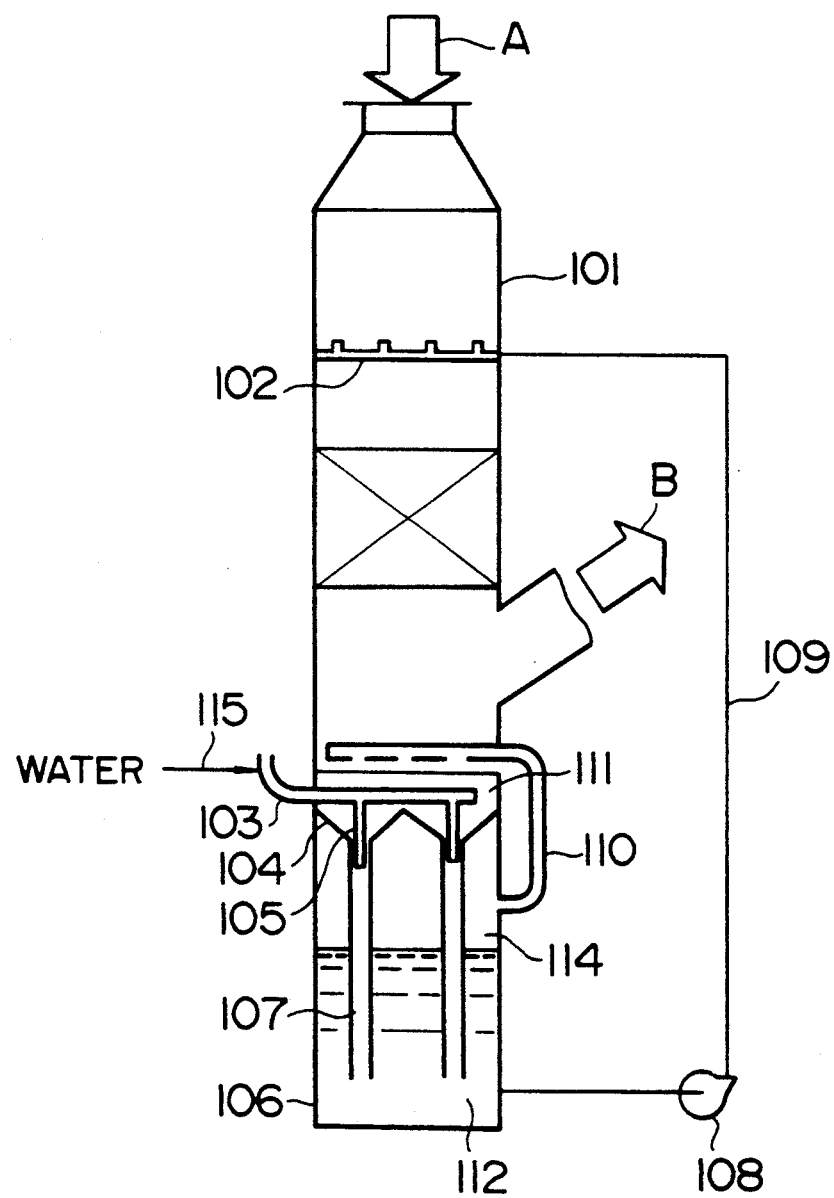
FIG. 6 is a schematic view of an embodiment of the second invention of this invention.

Referring to FIG. 6, untreated exhaust gas A containing $SO_2$ is directed to an absorbing tower 101, and treated by gas-liquid contact with the absorbing solution containing calcium compound which is sprayed from the spray nozzle 102, in the same way as that of the above-described embodiment of the first invention, and discharged as a treated exhaust gas B from the absorbing tower 101 after desulfurization. In this figure, reference numeral 108 denotes a circulating pump, and 109 denotes a circulating line. The absorbing solution which has absorbed $SO_2$ in the absorbing tower 101 drops into a reservoir 104 at the bottom of the absorbing tower 101 and is stored therein. The stored solution 111 is directed to the circulating tank 106 through a bottom pipes 107 which are connected to the bottom of the reservoir 104 and pass through the ceiling of the circulating tank 106 directly under the reservoir 104.

Figure 7:
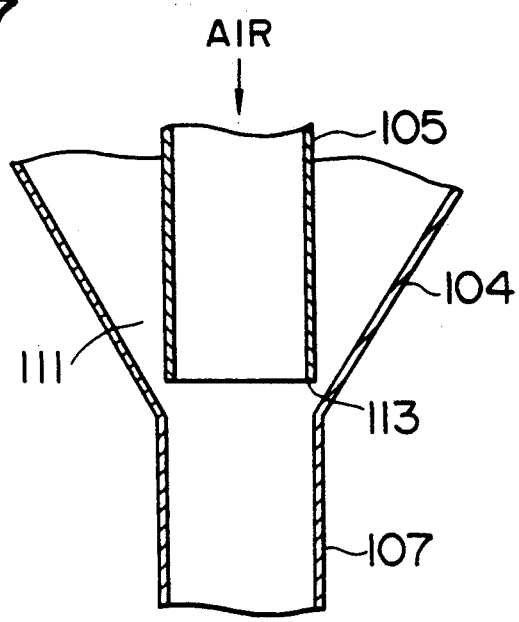
FIG. 7 is a partially enlarged view of an embodiment of the second invention.
Figure 8:
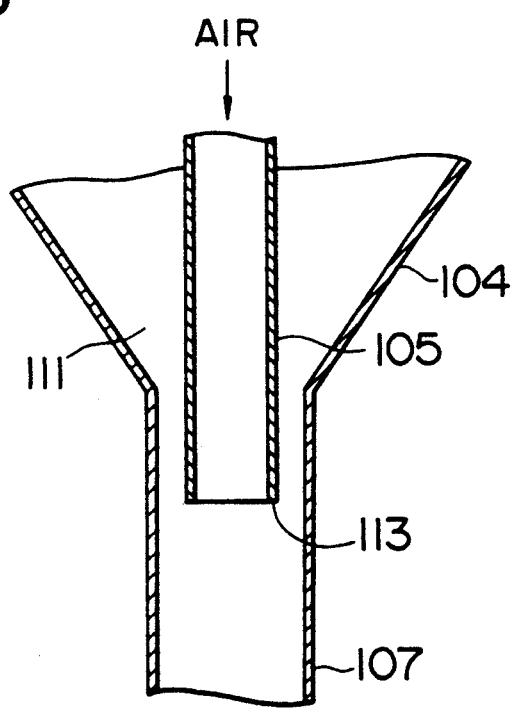
FIG. 8 is a partially enlarged view of another embodiment of the second invention.

At the entrance of bottom pipe 107 into which the stored solution 111 in the reservoir 104 flows, an air supply pipe 105 is mounted opposite to the bottom pipe 107 as shown in FIG. 7 or inserted in the bottom pipe 107 as shown in FIG. 8. The air supply pipes 105 are branched from an air feeding pipe 103 whose one end opens to the atmosphere. When the stored solution 111 in the reservoir 104 flows down in the bottom pipe 107, the flow separates at the periphery of the end of air supply pipe 105, resulting in the production of negative pressure. The negative pressure acts on the inside of the air supply pipe 105; as a result, air is supplied into the solution through the air feeding pipe 103 and the air supply pipe 105. A proper depth of solution in the reservoir 104 is kept by the flow resistance of solution between the air supply pipe 105 and the bottom pipe 107. The supplied air drops together with the solution through the bottom pipe, and distributed in the circulating tank 106, where the oxygen in the air reacts with the sulfite produced by the absorption of $SO_2$ from the exhaust gas A to form gypsum.

The air which rises from the absorbing solution 112 stored in the circulating tank 106 has a positive pressure in an air accumulation chamber 114, and discharged to above the surface of stored solution 111 in the reservoir 104 at the bottom of the absorbing tower 101 through an exhaust pipe 110. In the used air discharged from the air accumulation chamber 114 through the exhaust pipe 110, unreacted oxygen remains. By discharging the used air containing unreacted oxygen to above the surface of stored solution 111 in the reservoir 104 at the bottom of the absorbing tower 101, the used air is mixed into the stored solution 111 in the reservoir 104 by means of the drop energy of the absorbing solution dropping from the absorbing tower 101, so that the unreacted oxygen reacts with the sulfite in the same way as described above, which improves the utilization rate of oxygen in the supplied air.

In this process, the bubble of the supplied air can be made fine by dividing into plurality the respective air supply pipe 105 whose end is opposite to or inserted in the entrance of the bottom pipe 107. To intermittently clean the absorbing solution which flows backward into the air supply pipe 105 by surface tension, water is supplied to the air supply pipe 105 via a water feeding pipe 115.

Figure 9:
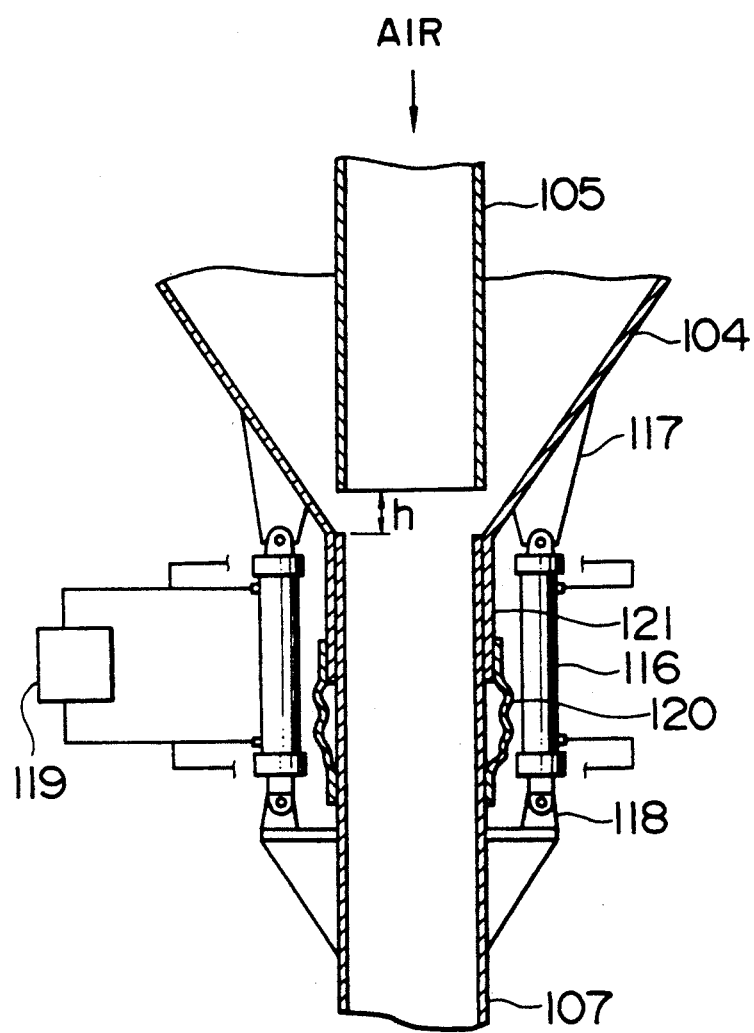
FIG. 9 is a partially enlarged view of an embodiment of the second invention.

FIG. 9 shows a mechanism for adjusting the flow resistance of solution at the portion where the air supply pipe 105 is arranged opposite to the bottom pipe 107. Referring to FIG. 9, an expansion cylinder 116 is connected to a fixing jig 117 joined to the external wall 104 at the bottom of reservoir, and the other end of the cylinder 116 is connected to a fixing jig 118 joined to the bottom pipe 107. The cylinder 116 is driven along a guide 121 pneumatically or hydraulically in accordance with the pressure signals generated by a pressure unit 119. As a result, the bottom pipe 107 is moved up and down. This changes a gap h between the end of the air supply pipe 105 and the end of the bottom pipe 107, which in turn changes the resistance at the gap h so that the amount of absorbing solution flowing down in the bottom pipe 107 is controlled. Consequently, the level of solution stored in the reservoir 104 is properly maintained. Reference numeral 120 denotes an expansion joint. The bottom pipe 107 is moved in this embodiment, but the air supply pipe 105 may be moved because the purpose is the adjustment of the gap h.

Figure 10:
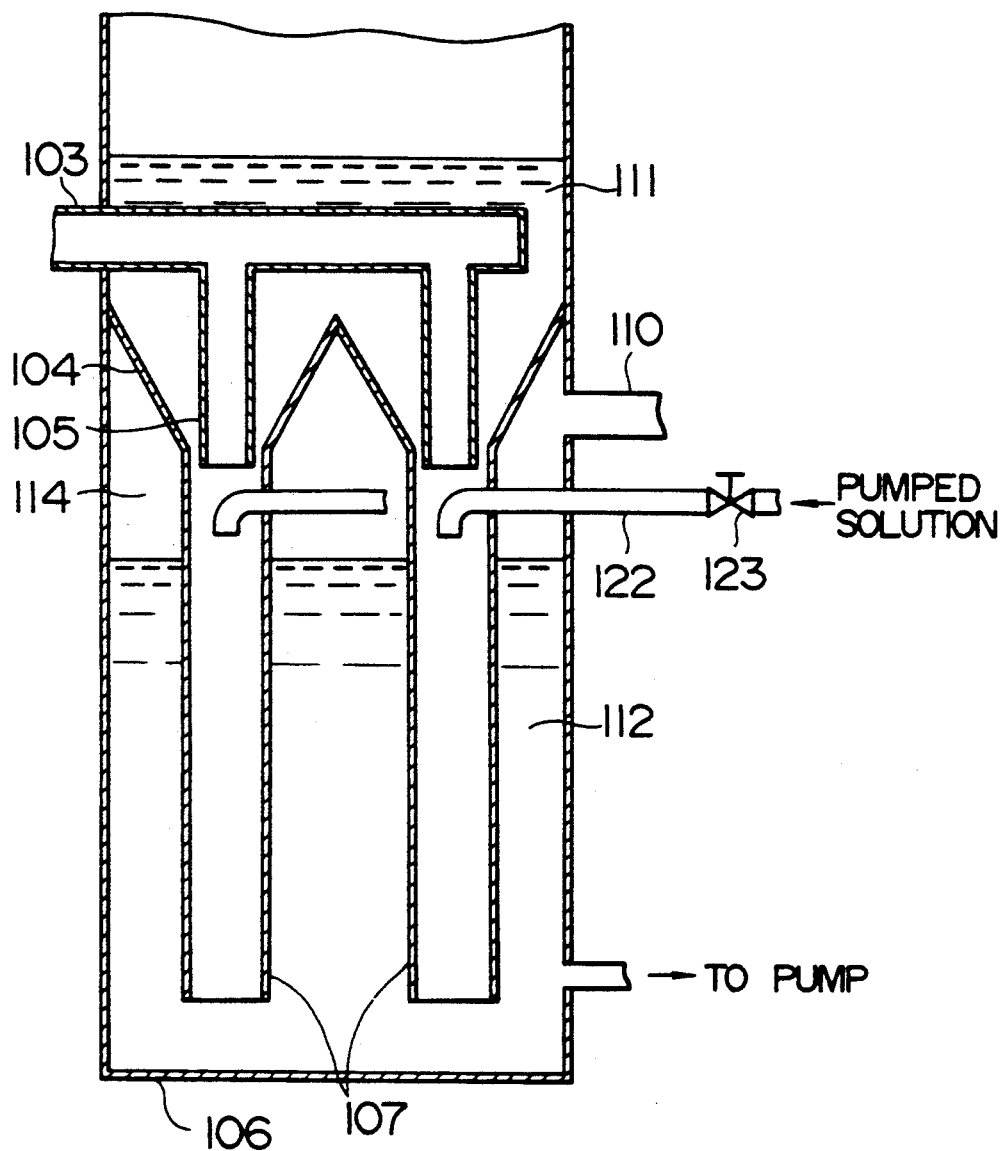
FIG. 10 is a partially enlarged view of an embodiment of the second invention.

FIG. 10 shows an embodiment in which a solution feeding pipe 122 which opens downward in the bottom pipe 107 and has a control valve 123 halfway therein, and the pumped solution is sprayed downward from the solution feeding pipe 122 so that flow rate of suction air is controlled. The pumped solution is sprayed in the bottom pipe 107 in this embodiment, but it may be sprayed downward in the air supply pipe 105 because the same effect is provided even when it is sprayed at the end portion of the air supply pipe 105.

Next, an embodiment of the third invention will be described with reference to FIG. 11. As with the embodiments described above, exhaust gas A containing $SO_2$ is directed to an absorbing tower 201, treated by gas-liquid contact with the absorbing solution, and discharged as a treated exhaust gas B from the absorbing tower 201 after desulfurization.

The absorbing solution which has absorbed $SO_2$ in the absorbing tower 201 drops into a reservoir 203 at the bottom of the absorbing tower 201 and stored therein. The stored solution 204 is injected toward a drop pipe 207 via a bottom pipe 205 which opens close to and opposite to the upper portion of the entrance increased-diameter portion of the drop pipe 207. The drop pipe 207 is connected to the bottom of the reservoir 203 and depends into the stored solution 210 stored in a circulating tank 208 through the ceiling 211 of the circulating tank 208. When the stored solution 204 is injected, a negative pressure is produced by an aspirator (water jet pump) action at the gap between the drop pipe 207 and the bottom pipe 205. This negative pressure draws air from the open end of the drop pipe 207. The air is distributed into the stored solution 210 in the circulating tank 208, so that the oxygen in the air reacts with the sulfite in the absorbing solution, which has flown down trough the drop pipe 207 into the stored solution 210 in the circulating tank 208, to form gypsum. Reference numeral 206 denotes a valve mounted in the bottom pipe 205.

Figure 11:
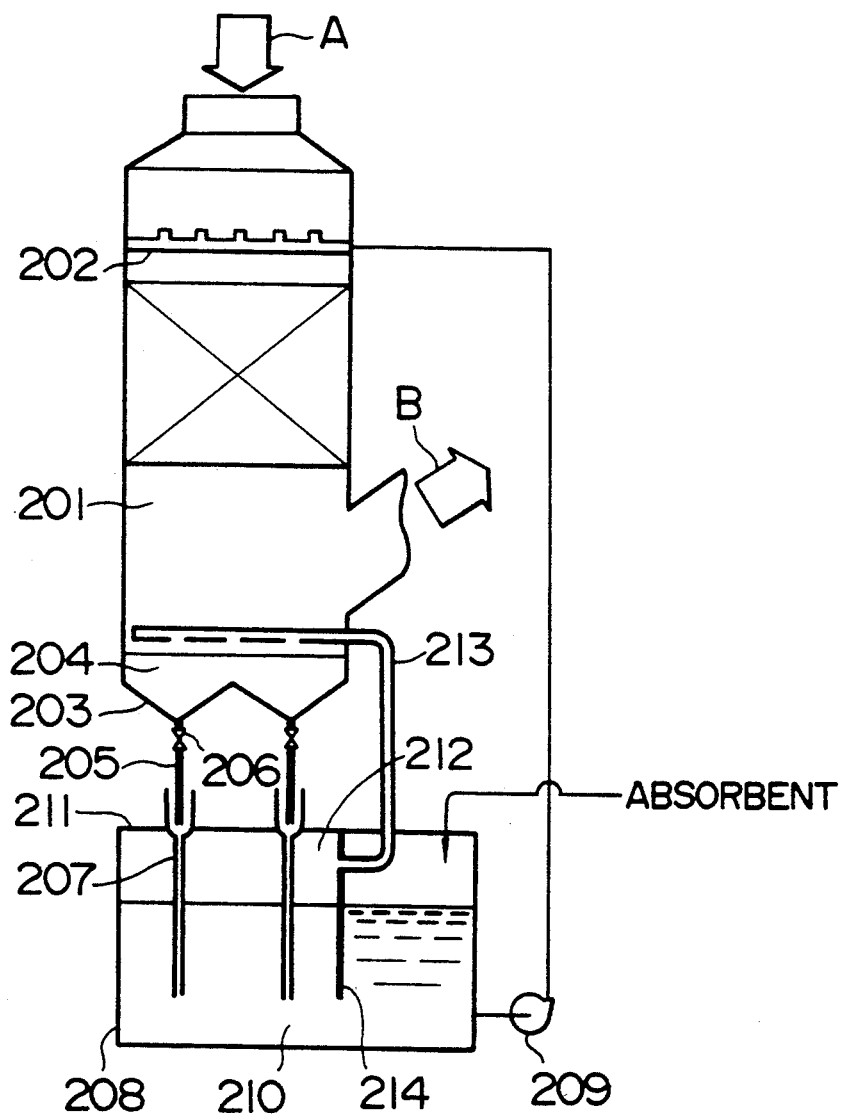
FIG. 11 is a schematic view of an embodiment of the third invention of this invention.
Figure 12:
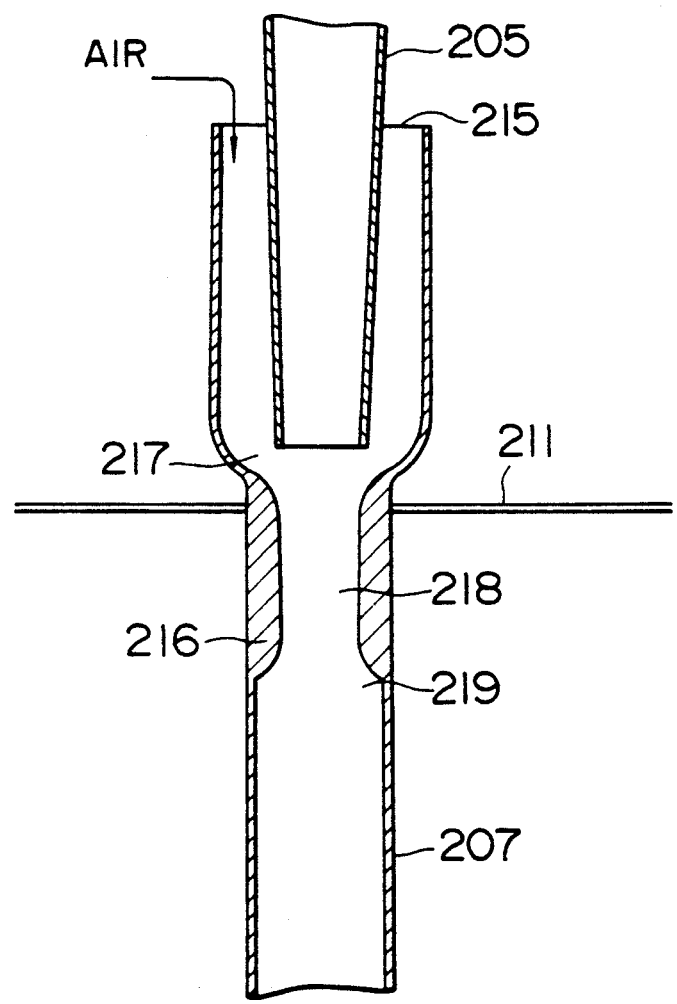
FIG. 12 is a partially enlarged view of an embodiment of the third invention.

FIG. 12 is a view for illustrating the details of the upper portion of the drop pipe 207 in relation to the bottom pipe 205 in this embodiment. In FIGS. 11 and 12, the like numerals refer to like parts. With reference to FIG. 12, the occurrence of aspirator action will be described in more detail.

The bottom pipe 205 is tapered downward from the intermediate part and its lower end is close to and opposite to the upper portion of the restriction means 216 at the upper part of drop pipe 207 mounted to the ceiling 211 of the circulating tank. The solution flowing from the reservoir 203 is injected from the lower end of the bottom pipe 205, and passes through a passage 218 in the restriction means 216. When the solution passes through a increased-diameter portion 219 at the lower part of the restriction means, a suction force is exerted by the separation of flow. By a negative pressure caused by the suction force, air is sucked into the drop pipe 207 through the top opening 215 thereof, and is directed to the circulating tank 208 through an air passage 217 while being absorbed by the solution.

In FIG. 11, the circulating tank 208 is divided into two compartments by a partition plate 214 which depends into the stored solution 210 from the ceiling 211 of circulating tank 208. The first compartment (left compartment in the figure) has an air accumulation chamber 212 above the solution which drops from the reservoir 203, whereas the second compartment (right compartment in the figure) has a neutralizing chamber in which calcium compound absorbent is added. The exhaust gas from the air accumulation chamber 212 is discharged onto the surface of stored solution 204 in the reservoir 203 at the bottom of the absorbing tower 201 via an exhaust pipe 213 which has a plurality of openings above the surface of the stored solution 204 in the reservoir 203, which improves the utilization rate of air.

According to the first invention, the absorbing solution sprayed in the absorbing tower is collected in the reservoir and then allowed to drop through the bottom pipe. By providing a means for separating the flow by utilizing the flow rate of solution dropping in the bottom pipe, a high negative pressure is produced. By using this negative pressure, air is automatically supplied from the atmosphere to oxidize sulfite for forming gypsum without using any power unit such as a blower or compressor. Furthermore, in order to automatically supply air in a stable manner for a long period of time, cleaning water is sprayed intermittently into the air supply ports so that the clogging of air supply port caused by the scale of gypsum is prevented.

According to the second invention, the absorbing solution sprayed at the upper part of the absorbing tower is trapped temporarily in the reservoir disposed above the circulating tank. By using the negative pressure produced by the separation of flow of solution dropping into the circulating tank, air is sucked automatically without using any equipment such as a blower or compressor. A proper level of solution is maintained by arranging the air supply pipe close to and opposite to the bottom pipe or by inserting the air supply pipe in the bottom pipe, so that the drop speed of solution from the bottom pipe is sufficiently high. Furthermore, the upper part of the circulating tank is used as an air accumulation chamber, and the used air is discharged onto the surface of the stored solution in the reservoir. The used air enters the stored solution together with the absorbing solution sprayed at the upper part of the absorbing tower, so that the remaining oxygen in the used air is effectively used.

According to the third invention, the absorbing solution sprayed at the upper part of the absorbing tower is trapped temporarily in the reservoir disposed in the absorbing tower, and injected from a specified pipe (bottom pipe). A negative pressure is produced by an aspirator (water jet pump) action caused by the separation of flow of solution at the restricted portion. By this negative pressure, air is automatically supplied for oxidation of sulfite without using any equipment such as a blower or compressor.

In addition, the circulating tank is divided into two compartments. The upper part of the compartment into which air flows is used as an air accumulation chamber, from which the used air is discharged onto the surface of the stored solution in the reservoir. The used air enters the stored solution together with the absorbing solution sprayed at the upper part of the absorbing tower, so that the remaining oxygen in the used air is effectively used.

We claim:

1. In a wet exhaust gas desulfurization system having a vertical absorption tower and means for supplying air thereto in which an exhaust gas desulfurization is performed by gas-liquid contact between the exhaust gas containing sulfur oxides and an absorbing solution containing a calcium compound in the absorbing tower, the improvement which comprises said system having:
   a) a reservoir in fluid communication with and below the tower for trapping the absorbing solution which has absorbed sulfur oxides from the exhaust gas;
   b) an absorbing solution circulating tank in fluid communication with and below the reservoir;
   c) open ended pipe means extending from the reservoir to a lower portion of the tank for transporting absorbing solution from the reservoir to the tank, and positioned such that an open end of the pipe means extends into the tank below the surface of any absorbing solution therein;
   d) water aspirator vacuum air supply means in the open ended pipe means for drawing outside air into the absorbing solution as it passes from the reservoir to the tank.

2. The system of claim 1 which further comprises water injection means in fluid communication with the air supply means; for intermittent injection of cleaning water into the air supply means.

3. The system of claim 1 which further comprises means for adjusting the position of the air supply means in the pipe means.

4. The system of claim 1 which further includes control means for controlling the flow of air drawn into the absorbing solution and comprising a means for spraying a solution into or adjacent to said air supply means.

5. In a wet exhaust gas desulfurization system having a vertical absorption tower and means for supplying air thereto in which an exhaust gas desulfurization is performed by gas-liquid contact between the exhaust gas containing sulfur oxides and an absorbing solution containing a calcium compound in the absorbing tower, the improvement which comprises said system having:
   a) a reservoir in fluid communication with and below the tower for trapping the absorbing solution which has absorbed sulfur oxides from the exhaust gas;
   b) an absorbing solution circulating tank in fluid communication with and below the reservoir;
   c) the reservoir having exit pipes in a lower portion thereof to withdraw absorbing solution therefrom, and the circulating tank having entrance pipes for introducing absorbing liquid from the exit pipes into the tank, the entrance pipes having a portion exterior of the tank and a portion interior of the tank, said interior portion extending beneath the surface of any absorbing solution therein, the exterior portion having a diameter larger than the diameter of the exit pipe, and wherein a lower end of the exit pipe is fitted into the exterior portion of said entrance pipe and cooperates therewith to aspirate outside air into absorbing solution as it passes from the exit pipe to the entrance pipe.

6. The system of claim 5 wherein the exit pipe has means for controlling the amount of absorbing solution exiting therefrom.

7. The system of claim 5 wherein the entrance pipe has a portion of narrowed diameter adjacent and below the lower end of the exit pipe to cause a venturi effect and increase the drawing of air into the absorbing solution.

* * * * *

UNITED STATES PATENT AND TRADEMARK OFFICE
CERTIFICATE OF CORRECTION

PATENT NO. : 5,209,905
DATED : May 11, 1993
INVENTOR(S) : Masakazu Onizuka, et al It is certified that error appears in the above-identified patent and that said Letters Patent is hereby corrected as shown below:

Title Page

Foreign application Priority Data item [62] Dec. 14, 1990 [JP]  JAPAN ....................2-413811
        Dec. 17, 1990 [JP]  JAPAN ....................2-411053
        Dec. 18, 1990 [JP]  JAPAN ....................2-411233

Signed and Sealed this

Twenty-sixth Day of April, 1994

Attest:

BRUCE LEHMAN

Attesting Officer     Commissioner of Patents and Trademarks